United States Patent Office.

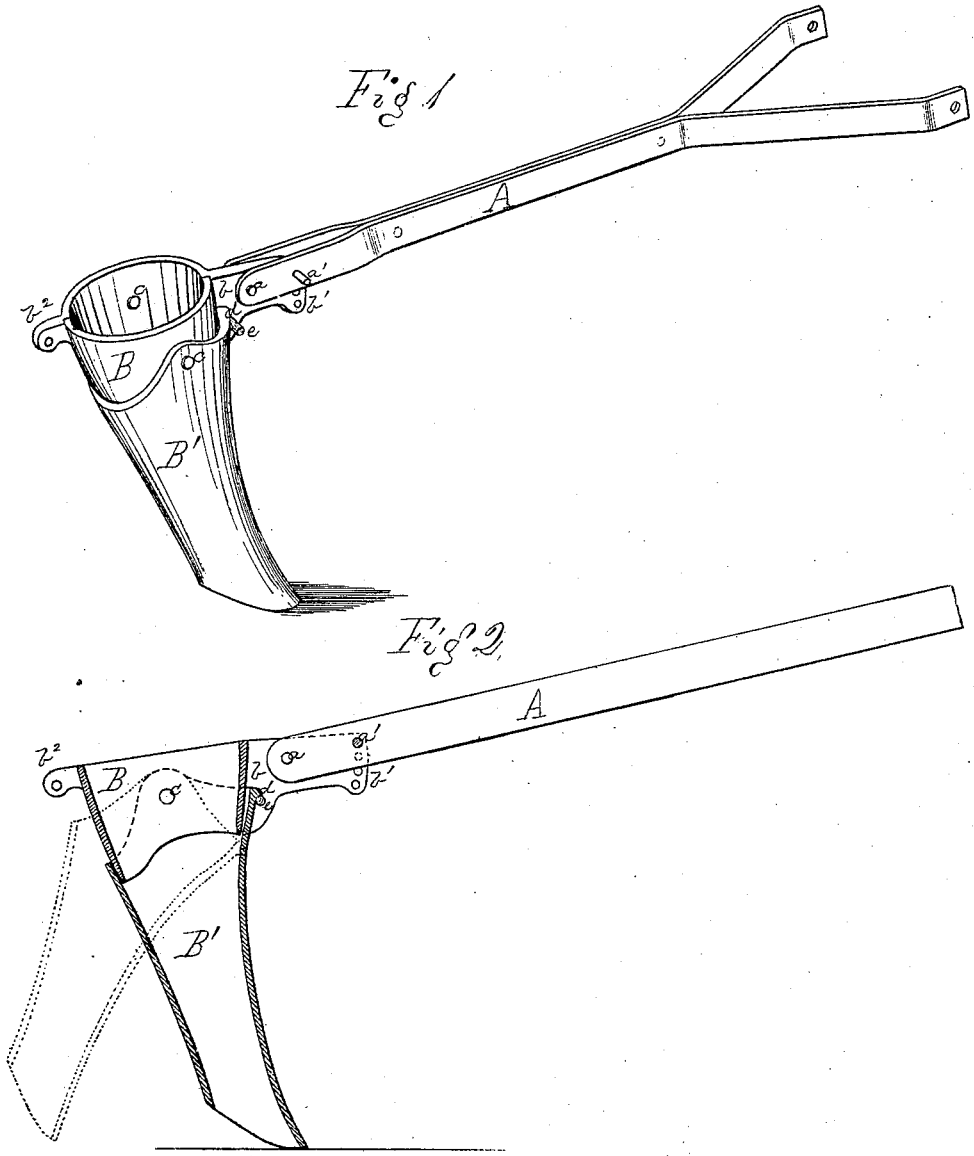

LYMAN BICKFORD, OF MACEDON, NEW YORK.

Letters Patent No. 102,081, dated April 19, 1870.

IMPROVEMENT IN GRAIN-DRILL TEETH.

The Schedule referred to in these Letters Patent and making part of the same.

*To all whom it may concern:*

Be it known that I, LYMAN BICKFORD, of Macedon, Wayne county, State of New York, have invented certain new and useful Improvements in Drill-Teeth for Grain-Drills, of which the following is a full, clear, and exact description, reference being had to the accompanying drawings making part of this specification, in which—

Figure 1 is a perspective view of the improved tooth and its drag-bar, and

Figure 2 represents a vertical longitudinal section through the same.

Similar letters of reference denote corresponding parts in both figures.

In the employment of the various constructions of drill-teeth it has been customary to hinge or pivot the teeth firmly at one point, and then to make the connection of the tooth with the bar rigid by the employment of a second fastening device, of such a character that, in the event of the tooth meeting or coming in contact with an obstruction, such as would be likely to break the tooth or machine, such second fastening would give way, and, releasing the tooth, would allow it to turn up or fold backward, turning on the pivot referred to, until it had passed the obstruction, when it could be replaced, and again secured in working position.

This has been considered an indispensable requisite of drill-teeth; but in the constructions heretofore used much difficulty has been experienced in the efforts to prevent, and much annoyance occasioned by, the breaking and cutting away of the conveyer-tubes, which conduct the seed or grain from the hopper to the teeth, said tubes entering the upper ends of the teeth, and consequently being injuriously affected by the folding of said teeth. Where such conveyer-tubes were made of rubber, or similar material, they are found to be rapidly cut away, and sometimes they are torn from their fastenings; and where light metallic tubes are used, the lower ends of said tubes become bent and flattened in such manner as to interfere with the proper discharge of the grain therefrom.

The object of the present improvement is to overcome the difficulty referred to, while, at the same time, the requisite capability of yielding to heavy obstructions is preserved; and, to this end, The invention consists in making the tooth in two (or more) parts, one of which (that part into which the conductor-tube enters) shall maintain a fixed relation to the drag-bar, and also to the conductor-tube, that is, so far as any folding action is concerned, while another portion (that which rests upon the ground, or forms the furrow in which the seed is deposited) can be folded or turned up for passing an obstruction, as hereinafter explained.

In the annexed drawing—

A represents a drag-bar, through which the drill-tooth is connected to the frame of the machine, in any usual manner.

B is the upper portion or mouth of the drill-tooth, made in the hollow, tapering form represented, and provided in front with an arm or tongue, $b$, which is pivoted at $a$ to the bar A.

The forward end of arm $b$ is expanded and perforated, as shown at $b^1$; and a pin or bolt, at $a'$, passing through one of such perforations, and through the bar A, serves, in connection with pivot $a$, to hold the portion B in a fixed position relative to the bar A, and at any desired angle of relation thereto as the character of the soil operated upon may require.

B' is the lower furrowing portion of the tooth, made, by preference, in the tapering form represented in the drawings, with the usual furrowing-point at its lower end, and expanded at its upper end to receive and inclose the lower end of the portion B.

The upper end of portion B' is provided with ears, through which said portion is united with the portion B by pivot-bolts or pins, $c$, on which, when not restrained, the lower portion B' is free to turn or fold backward, as represented in dotted lines, fig. 2, for passing obstructions.

The forward upper end of portion B' has a lip, at $d$, slotted to receive a flange of arm $b$, through which, and in front of lip $d$, a wooden pin, $e$, passes, which serves to hold the lower portion B' of the tooth in working position.

When the tooth meets a stump, a large stone, or heavy obstruction, which would be liable to break it, the pin $e$ breaks, and allows the lower portion of the tooth to fold back, as shown, until the obstruction is passed, when the tooth can be again readily replaced and secured as before. Any suitable fragile fastening device or arrangement of yielding spring which will answer the same purpose may be substituted for the wooden pin $e$, or its equivalent.

The upper portion B of the tooth is provided with a perforated lug or ear, $b^2$, through which the tooth is connected, by a chain or cord, with the lifting-roller or lever, in the usual manner.

The teeth may be constructed with additional sections, intermediate between B B', if desired; but for ordinary purposes the construction shown will be found sufficient to fully accomplish the object stated.

By this construction it will be seen that the portion of the tooth into which the conveyer-tube enters is always maintained in a fixed relation to said tube and the drag-bar, and all injury to the conveyer-tubes is thereby avoided, while that portion of the tooth which is liable to come in contact with obstructions is furnished with the required capability of yielding to such obstructions, and all danger of breaking the tooth is thereby also avoided.

Having now described the improvement,

What is claimed as new, and sought to be secured by Letters Patent, is—

1. A jointed drill-tooth, one portion of which maintains a fixed relation to the drag-bar, while another portion is made capable of yielding to obstructions, as specified.

2. The drill-tooth, composed of two sections, jointed to each other, in combination with the wooden pin $e$, or equivalent device, for the purpose set forth.

3. The drill-tooth, made in sections, substantially as and for the purpose described, in combination with the perforated or slotted arm $b$ and adjusting-bolt $a'$, or an equivalent device, whereby the tooth may be set at any desired angle of presentation to the ground, as required.

LYMAN BICKFORD.

Witnesses:
W. L. ACKER,
S. L. GILLIS.